United States Patent
Boss et al.

(10) Patent No.: US 10,282,732 B2
(45) Date of Patent: May 7, 2019

(54) ANALYSIS OF CUSTOMER FEEDBACK FOR APPLICATIONS EXECUTING ON DISTRIBUTED COMPUTATIONAL SYSTEMS

(71) Applicant: INTERNATIONAL BUSINESS MACHINES CORPORATION, Armonk, NY (US)

(72) Inventors: Gregory J. Boss, Saginaw, MI (US); Christopher J. Dawson, Arlington, VA (US); Rick A. Hamilton, II, Charlottesville, VA (US); Jenny S. Li, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/882,479

(22) Filed: Oct. 14, 2015

(65) Prior Publication Data
US 2017/0109758 A1    Apr. 20, 2017

(51) Int. Cl.
*G06Q 30/00* (2012.01)
(52) U.S. Cl.
CPC .................... *G06Q 30/016* (2013.01)
(58) Field of Classification Search
CPC ....................................................... G06Q 30/00
USPC .......................................................... 705/304
See application file for complete search history.

(56) References Cited

U.S. PATENT DOCUMENTS

| | | | |
|---|---|---|---|
| 7,933,926 B2 | 4/2011 | Ebert | |
| 8,601,095 B1 * | 12/2013 | Carlson | H04N 21/6582 709/202 |
| 8,943,061 B2 | 1/2015 | Fraczak et al. | |
| 2004/0249786 A1 * | 12/2004 | Dabney | G06Q 10/10 |
| 2007/0127693 A1 * | 6/2007 | D'Ambrosio | G06Q 10/10 379/265.06 |
| 2007/0226201 A1 * | 9/2007 | Lerum | G06F 11/0748 |
| 2009/0037414 A1 | 2/2009 | Olivier et al. | |

(Continued)

FOREIGN PATENT DOCUMENTS

AU    2014101196 A4    11/2014

OTHER PUBLICATIONS

Al-Sharawneh et al., "Web Service Reputation Prediction based on customer Feedback Forecasting Model" 2010 14th IEEE International Enterprise Distributed Object Computing Conference Workshops, pp. 33-40.

(Continued)

*Primary Examiner* — Kira Nguyen
(74) *Attorney, Agent, or Firm* — Cantor Colburn LLP; William Kinnaman

(57) ABSTRACT

Embodiments include method, systems and computer program products for analysis of customer feedback on an application executing on a distributed computational system. Aspects include receiving feedback from a user of the application, wherein the application includes a plurality of components and wherein at least two of the plurality of components are provided by separate service providers in the distributed computational system. Aspects also include identifying one or more of the plurality of components that the feedback corresponds to and forwarding the feedback to one or more of the plurality of service providers associated with the one or more of the plurality of components identified.

18 Claims, 6 Drawing Sheets

(56) References Cited

U.S. PATENT DOCUMENTS

| | | | |
|---|---|---|---|
| 2010/0037166 A1* | 2/2010 | Chandrasekar | G06Q 30/02 |
| | | | 715/769 |
| 2013/0097304 A1 | 4/2013 | Asthana et al. | |
| 2013/0173404 A1 | 7/2013 | Scipioni | |
| 2013/0219043 A1 | 8/2013 | Steiner et al. | |
| 2013/0268861 A1 | 10/2013 | Bailey et al. | |
| 2013/0304543 A1 | 11/2013 | Anderson | |
| 2013/0346155 A1 | 12/2013 | Briggs | |
| 2014/0044250 A1 | 2/2014 | Gartner et al. | |
| 2014/0317006 A1 | 10/2014 | Brill et al. | |
| 2014/0365397 A1* | 12/2014 | Mitra | G06Q 30/0282 |
| | | | 705/347 |
| 2015/0058118 A1* | 2/2015 | Clurman | G06Q 30/0251 |
| | | | 705/14.49 |
| 2015/0088608 A1 | 3/2015 | Cama et al. | |
| 2015/0120389 A1* | 4/2015 | Zhang | G06Q 10/10 |
| | | | 705/7.32 |
| 2015/0170228 A1 | 6/2015 | Wheeler et al. | |
| 2016/0042070 A1* | 2/2016 | Rossi | G06F 17/30864 |
| | | | 707/709 |

OTHER PUBLICATIONS

Choi et al., "Eliciting Customer Preferences for Products From Navigation Behavior on the Web: A Multicriteria Decision Approach With Implicit Feedback", IEEE Transactions on Systems, Man, and Cybernetics, Part A, vol. 39, No. 4, Jul. 2009; pp. 880-889.

Hu et al., "Collaborative Filtering for Implicit Feedback Datasets", 2008 Eighth IEEE International Conference on Data Mining; pp. 263-272.

* cited by examiner

ANALYSIS OF CUSTOMER FEEDBACK FOR APPLICATIONS EXECUTING ON DISTRIBUTED COMPUTATIONAL SYSTEMS

BACKGROUND

The present disclosure relates to analysis of customer feedback for applications and more specifically, to methods, systems and computer program products for analysis of customer feedback on an application executing on distributed computational systems.

End users and application owners are often not aware of how and/or where a particular application is being executed, and may increasingly have difficulty ascertaining whether a particular application is running on a single or multiple computational environments. Therefore, if a customer (either an end user or application owner) has feedback on the information technology (IT) environment which supports the application, it may be unclear what service providers the feedback applies to, due to such service ambiguity. For example, if a webpage search function is not performing as fast a user expects, the user may provide feedback that the website is slow or inoperable. In this case, it may be difficult to determine that it was in fact only the search function of the website that was experiencing service issues.

The issue of service ambiguity is compounded by the fact that distributed computational systems, also referred to herein as cloud environments, are growing increasingly complex. In ever-increasing numbers, a single operation may in fact be several functions that are each executed by different computational facilities in elemental pieces. This may occur in a variety of ways, including, but not limited to: an organizational IT department disaggregating a request and sending pieces of it to various cloud providers; an organizational IT department disaggregating a request and sending parts to cloud providers, while other pieces are performed in-house; a cloud service provider transparently disaggregating a request, and sending parts of the job to far-reaching sections of its own enterprise; and a cloud service provider transparently disaggregating a request, and in effect subcontracting parts of the job to other providers, which may not be known to the original requestor. Other possibilities exist, but it may be readily seen that in such complex scenarios, it may be difficult to ascertain where problems affecting the user experience with an application are actually occurring.

SUMMARY

In accordance with an embodiment, a method for processing customer feedback on an application executing on a distributed computational system is provided. The method includes receiving feedback from a user of the application, wherein the application includes a plurality of components and wherein at least two of the plurality of components are provided by separate service providers in the distributed computational system. The method also includes identifying one or more of the plurality of components that the feedback corresponds to and forwarding the feedback to one or more of the plurality of service providers associated with the one or more of the plurality of components identified.

In accordance with another embodiment, a processing system for analyzing customer feedback on an application executing on a distributed computational system includes a processor in communication with one or more types of memory. The processor is configured to receive feedback from a user of the application, wherein the application includes a plurality of components and wherein at least two of the plurality of components are provided by separate service providers in the distributed computational system. The processor is also configured to identify one or more of the plurality of components that the feedback corresponds to and forward the feedback to one or more of the plurality of service providers associated with the one or more of the plurality of components identified.

In accordance with a further embodiment, a computer program product for processing customer feedback on an application executing on a distributed computational system includes a non-transitory storage medium readable by a processing circuit and storing instructions for execution by the processing circuit for performing a method. The method includes receiving feedback from a user of the application, wherein the application includes a plurality of components and wherein at least two of the plurality of components are provided by separate service providers in the distributed computational system. The method also includes identifying one or more of the plurality of components that the feedback corresponds to and forwarding the feedback to one or more of the plurality of service providers associated with the one or more of the plurality of components identified.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
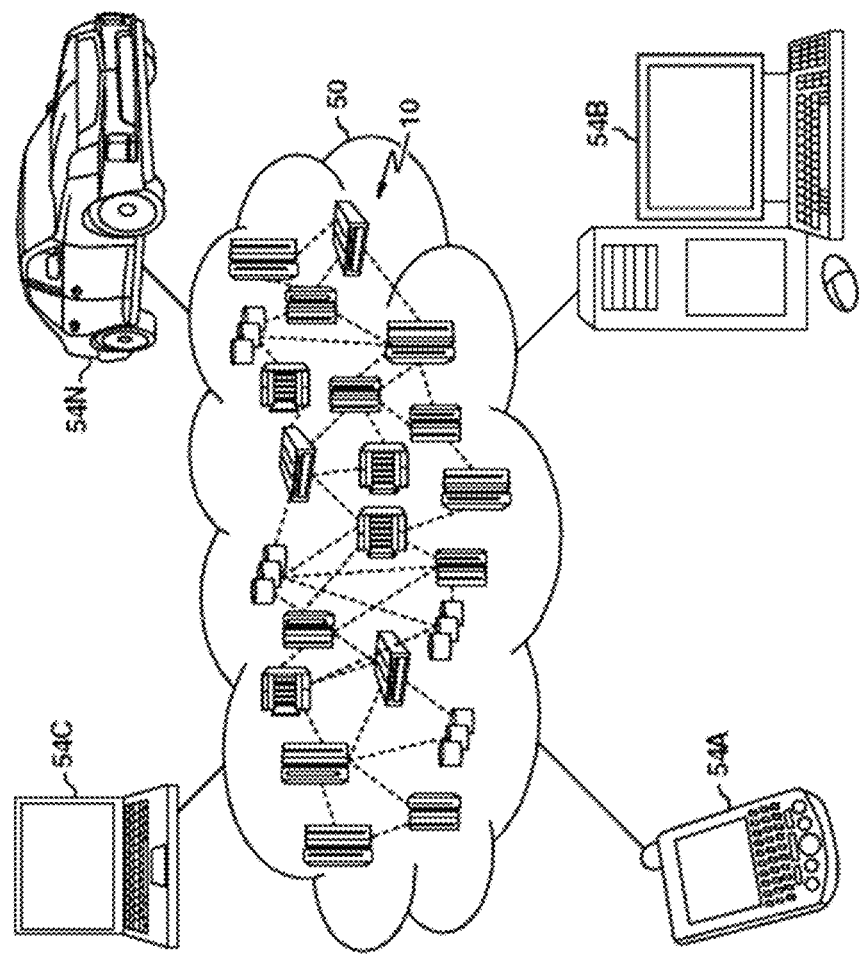
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
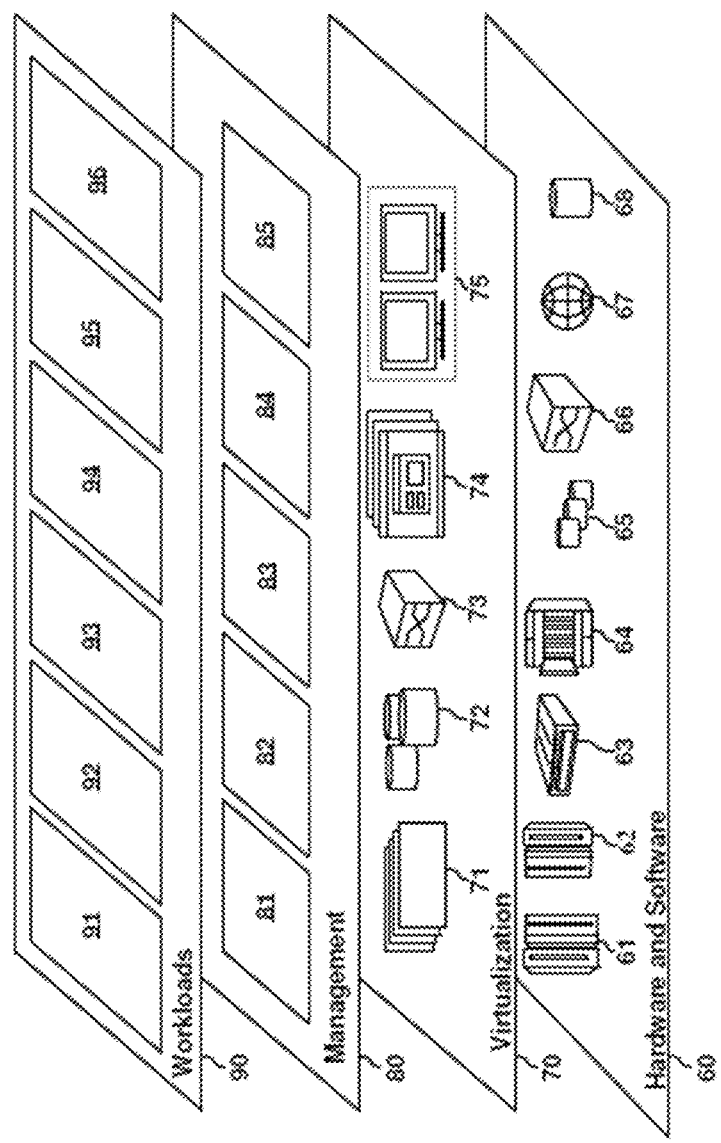
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing and analysis of customer feedback on applications 96.

In accordance with exemplary embodiments of the disclosure, methods, systems and computer program products for performing analysis of customer feedback on an application executing on a distributed computational system are provided. In exemplary embodiments, applications that are executing on a distributed computational system are configured such that user feedback, or comments, can be added directly to objects that make up the application via a user interface of the application. In exemplary embodiments, the feedback received from users is associated with a component, or object, of the application. The association may occur either implicitly through linking an object the user clicked on with a table of associated service providers or deterministically through a series of progressive questions presented to the user. In exemplary embodiments, a service provider associated with a component of the application that the user provided feedback on is provided with the user feedback. In exemplary embodiments, service level agreements (SLAs) for components of the application can be monitored based on the collection of data associated the use of the application. In addition, the user interface of the application can be configured to display information relating to the SLA on the user interface of the application to provide users with a realistic expectation of an amount of time required to perform a task.

Figure 3:
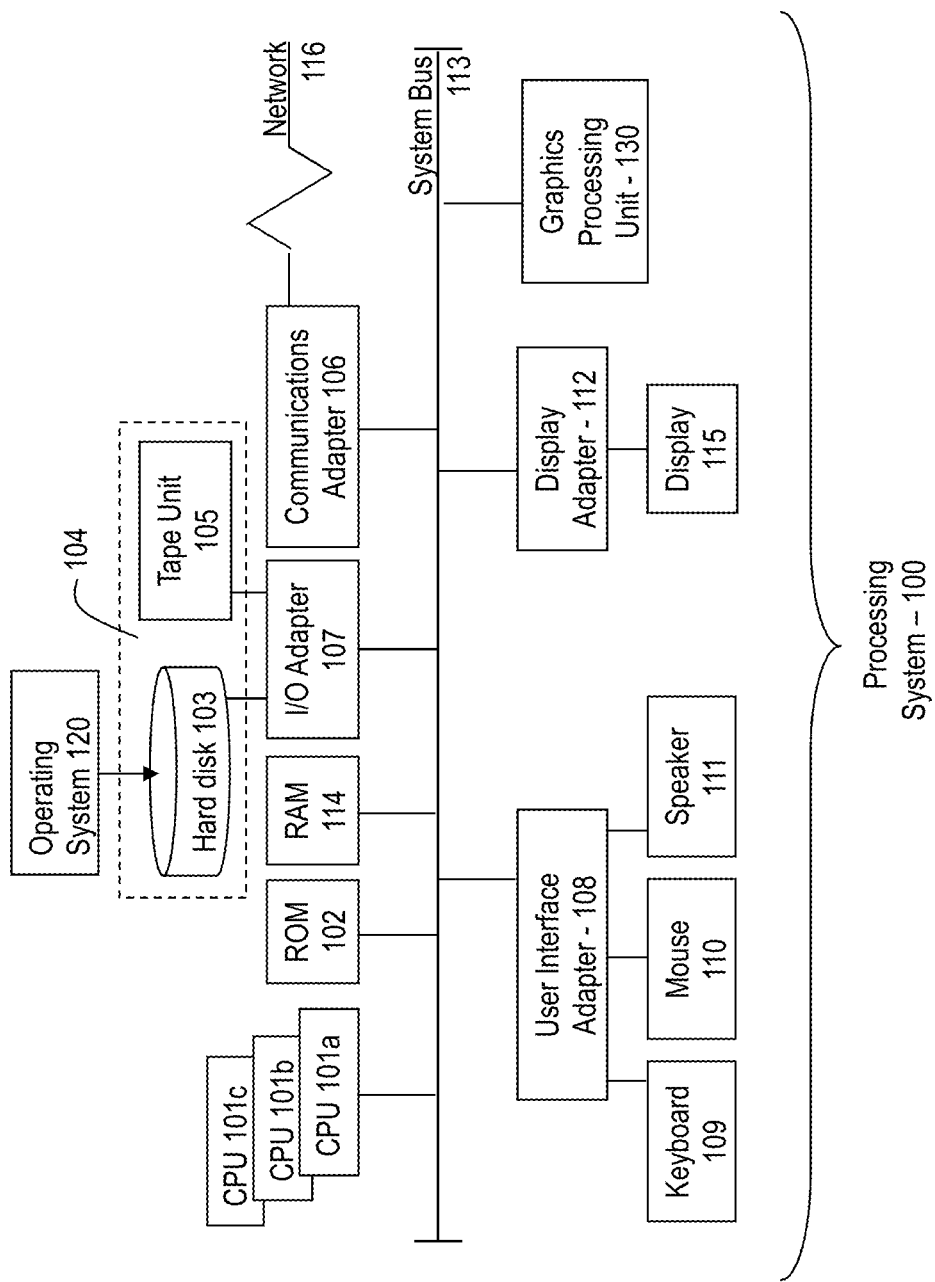
FIG. 3 is a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 3.

Figure 4:
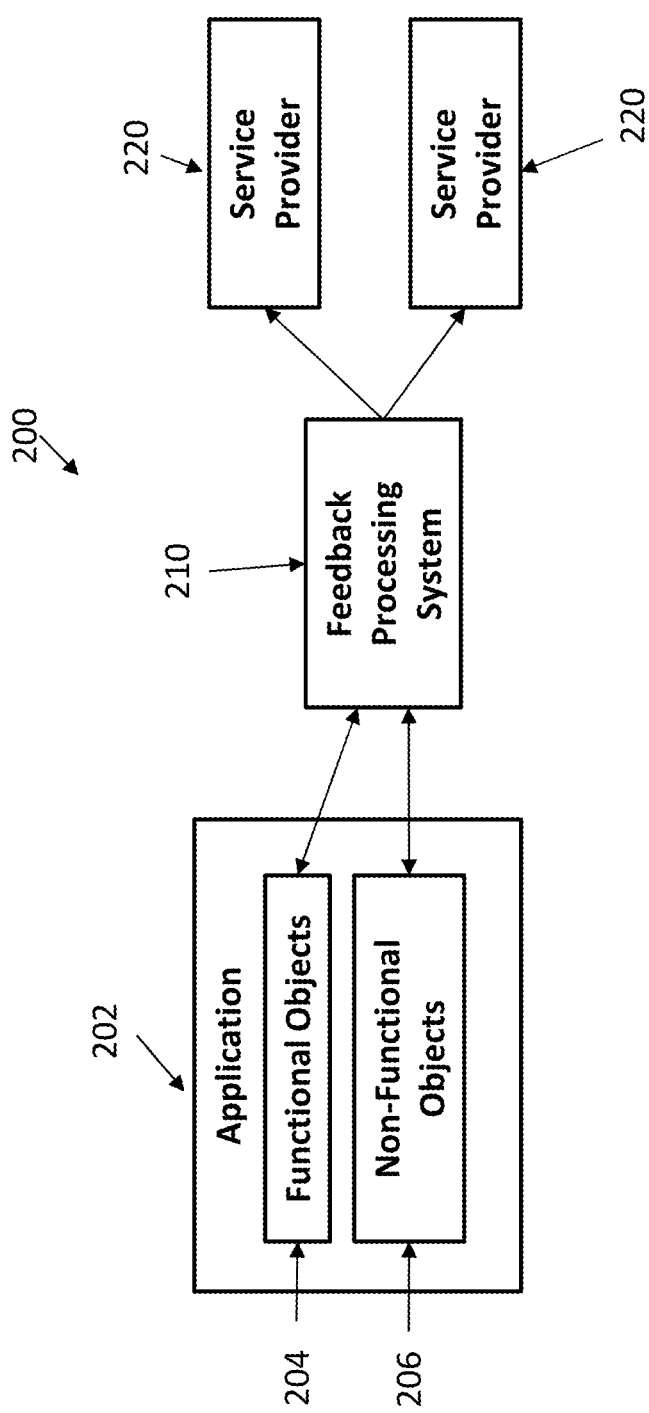
FIG. 4 is a block diagram illustrating a distributed computational system in accordance with an exemplary embodiment.

Referring now to FIG. 4, a distributed computational system 200 in accordance with an exemplary embodiment is illustrated. As illustrated, the distributed computational system 200 includes an application 202 which includes both functional objects 204 and non-functional objects 206. In one embodiment, the application 202 may be a website and the functional object 204 is a component, or part, of the website that a user interacts with. For example, the functional object 204 may be a search function on the website, a find a store location of the website, a hyperlink on the website, an ordering function of the website, or the like. In exemplary embodiments, the application 202 may also include non-functional objects 206 that are aspects of the applications 202 that the user does not directly interact with but which are utilized by the application 202. Such non-functional objects 206 may include JavaScripts, security features, user tracking features, performance measurements or the like. Non-function objects 206 may not be visible on the user interface of the website. Non-functional objects 206 can be related to a functional object 204 of the website. For example, a functional object 204 of a retail website can be a store locator feature which a user can search for a store location near him or her. In this example, the objects may have an associated SLA which can be the expected time it takes for the store locator feature to return the search result to the user.

As illustrated, the distributed computational system 200 includes multiple service providers 220. In exemplary embodiments, each of the service providers 220 are associated with at least one of the functional objects 204 and the non-functional objects 206 of the application 202. The distributed computational system 200 also includes a feedback processing system 210 that is configured to receive feedback on the functional objects 204 and the non-functional objects 206 of the application 202 and to responsively provide feedback to the appropriate service provider 220. In exemplary embodiments, the feedback processing system 210 may be a processing system such as the one shown in FIG. 3.

Figure 5:
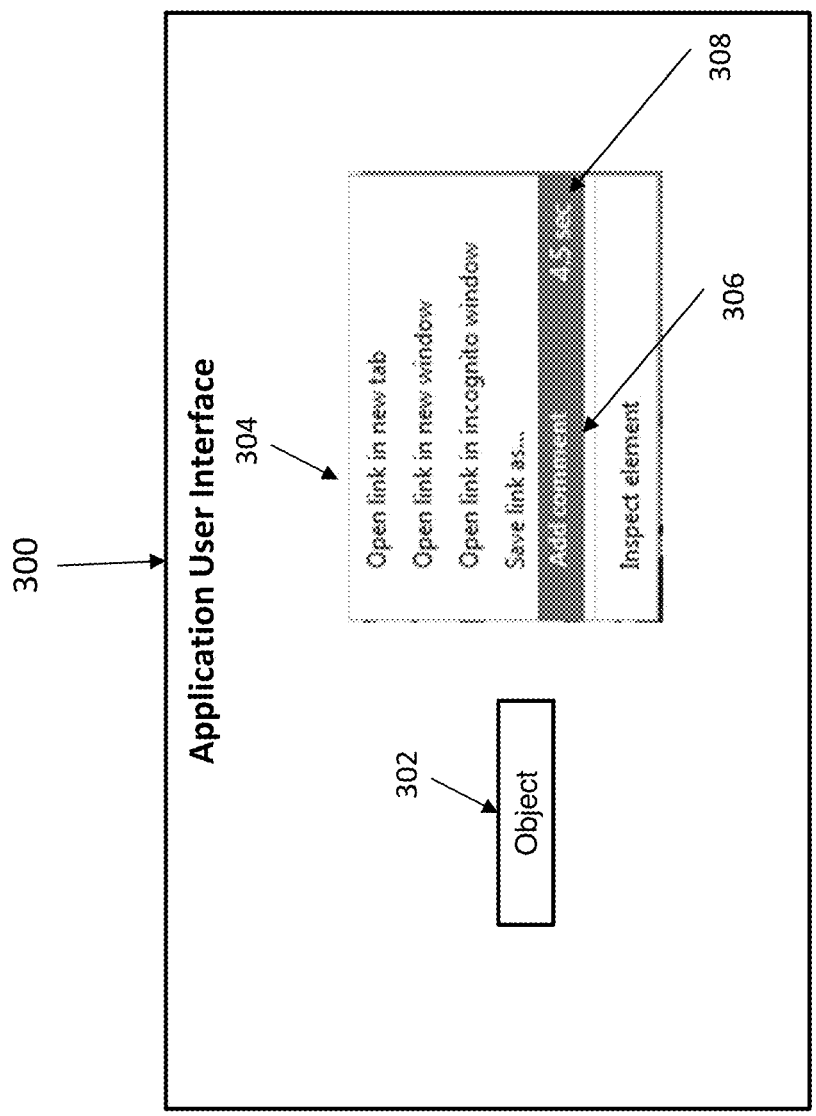
FIG. 5 is a schematic diagram illustrating a user interface of an application executing on distributed computational system in accordance with an exemplary embodiment.

Referring now to FIG. 5, a schematic of an application user interface 300 of an application in accordance with an exemplary embodiment is illustrated. As illustrated the application user interface 300 includes an object 302. In exemplary embodiments, the object may be an image, hyperlink or other item that is associated with a functional object, as discussed above. For example, the object 302 may be a search button that is located next to a textual input filed on a website. In another example, the object may be a hyperlink that directs a web browser to another website. In exemplary embodiments, the application user interface 300 is configured such that a pop-up window 304 is displayed when a user selects the object 302 in a predetermined manner. For example, the pop-up window 304 may displayed when a user right clicks on the object 302, double clicks on the object 302, or holds their finger on the object 302 for more than a fixed amount of time.

In exemplary embodiments, the pop-up window 304 of the application user interface 300 includes a feedback link 306 and a performance expectation 308 for the object 302. In exemplary embodiments, upon a user selecting the feedback link 306, the user is presented with a feedback window for entering their feedback for the object 302. In one embodiment, the feedback window may be configured to allow free form feedback, i.e., unstructured textual feedback from the user. In another embodiment, the feedback window may present the user with one or more feedback multiple choice questions that allow the user to select from a series of possible service issues. In addition, the feedback window may include a series of feedback selections that are designed to guide the user in providing feedback regarding the object 302. For example, upon entering a feedback window, the user may first be provided with a high level question to determine if they want to leave positive or negative feedback. Based on the response received from the user, the next question presented to the user can be selected to elicit information that can be used to properly identify the service provider to whom the feedback should be directed.

In exemplary embodiments, the performance expectation 308 of the application user interface 300 is configured to provide a user of an application with a realistic expectation of the amount of time required for the execution of a function associated with the object 302. In one embodiment, if the object 302 is a store locator function on a retail website, the performance expectation 308 may be a period of time in which a service provider for the store locator function has agreed to process such requests, also referred to herein as the service level agreement (SLA) between the website and the service provider. In another embodiment, if the object 302 is a store locator function on a retail website, the performance expectation 308 may be a mean period of time in which the service provider has processed such requests in the past. In this example illustrated, it takes an average of 4.5 seconds to locate a store once the user click the store locator. If the user experiences a delay in time which exceeds the expected period of time to execute the function, the user can select the "Add comment" feature 306 to leave feedback on the function associated with object 302.

In exemplary embodiments, in addition to the feedback provided by the user, metadata may be collected about the users and likewise disseminated to the service providers with along with the user feedback. Such metadata could include geographic information, browser version, user's time spent on the site, and so forth, as is known today. By collecting and providing this metadata to the service provides, it may allow the service providers to better identify the cause of service problems, such as compatibility with a specific web browser.

In exemplary embodiments, the application includes a service that is being transparently generated by multiple service providers. For example, the service may be a retail application that includes a security application, web services, and database functionality that are all being provided by different service providers. In exemplary embodiments, if a user is satisfied with all aspects of the application, then each service provider can be notified. However, if a user is dissatisfied with some aspects of the application, then the feedback window should be configured to facilitate a determination of where the problem exists. For example, if navigation on the retail page is satisfactory, but a user is dissatisfied with a log-in and password steps, then feedback should be provided to the security service accordingly.

In exemplary embodiments, the user satisfaction with aspects of the service may be determined by tracking the interaction of the user with the service and determining whether a nonfunctional object has meet its SLA. The SLA for an object may be a maximum allowable time to execute a task associated with the object. For example, if the object is configured to load a video for display, the SLA may be a maximum amount of time for rendering and displaying the video. If this amount of time is exceeded, the SLA is not meet and the service provider responsible for that object can be notified. Likewise if the allotted amount of time is not-exceeded, the SLA is met and the service provider responsible for that object is notified.

Figure 6:
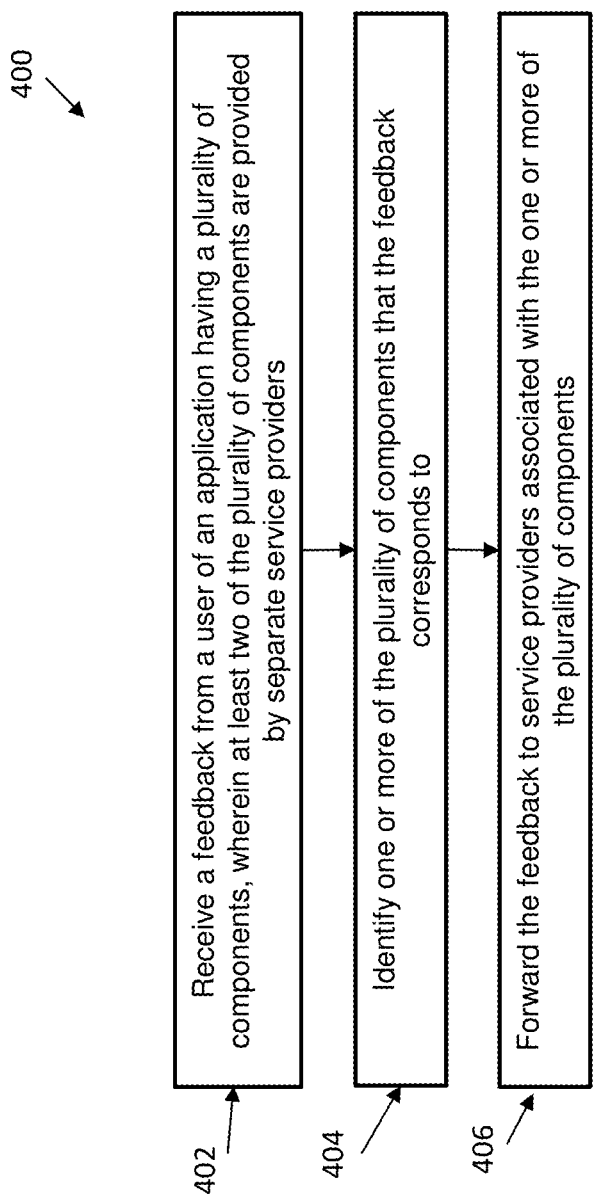
FIG. 6 is a flow diagram of a method for processing customer feedback on an application executing on a distributed computational system in accordance with an exemplary embodiment.

Referring now to FIG. 6, a flow diagram of a method 400 for performing analysis of customer feedback on an application executing on a distributed computational system in accordance with an exemplary embodiment is shown. As shown at block 402, the method 400 includes receiving feedback from a user of an application having a plurality of components, wherein at least two of the plurality of components are provided by separate service providers. Next as shown at block 404, the method 400 includes identifying one or more of the plurality of components that the feedback corresponds to. The method 400 also includes forwarding the feedback to service providers associated with the one or more of the plurality of components, as shown at block 406. In another embodiment, components of the application can be made up of a plurality of components. For example, a store locator component on a retail website may contain a component to locate the user's current location, a component to search for a nearby store location within 10 miles from the current location of the user, and a component to show the driving route from the user's current location to the closest store location.

In exemplary embodiments, the feedback of a user for an application can be collected via the user interface using deterministic or implicit methods. In exemplary embodiments, the implicit methods can include adding a feedback link to object that is available on the application, such as the one shown in FIG. 5. This feedback link will allow the end user to add a comment directly to a selected object of the application. In exemplary embodiments, the feedback link allows the user to easily identify the object of the application that is relevant to their complaint. In exemplary embodiments, the user interface of the application can be configured to display data regarding an expected execution time for the object selected. The data may indicate how long that object typically takes to complete its task. In other variations the data could include the delta between the normal baseline and the last measured run thus enabling the user to see a relative performance.

In one example, a user browsing a retail website clicks a "find a store" object and leaves feedback on this object. This "find a store" object has two functional components a "locate a store" function and a "show directions" function, which are individually hosted in by two different service providers. If the user feedback includes the comment "Easy to use, fast response. The direction is great", then both the service providers for the "locate a store" component and the "show directions" component should be notified. However, if the user feedback includes a comment to complain that the show direction feature is not helpful, then only the service provider associated with the "show direction" component will be notified. The determination of good feedback versus bad feedback may be pursued with either explicit quantitative assessments, such as grading performance on a scale of 1 to 5, or may be ascertained using sentiment analysis on the text. Any of a variety of existing sentiment analysis tools can be used, such as Meltwater, Google Analytics, Hootsuite, Facebook Insights and Social Mention.

In exemplary embodiments, user provided feedback is mapped to, or associated with, the service providers that are responsible for the objects that are relevant to the feedback. In one embodiment, information that is used to perform the mapping is obtained from the user through a series of questions and is solicited at the time the user submits feedback. In another embodiment, the each object of the application can be tagged with metadata which is used to perform the mapping.

For example a user's comment "The get direction feature is very helpful" can be linked to the "find a store" object from the website. In exemplary embodiment, a javascript element, or equivalent Web markup language, which is used to create the feedback window two pieces of metadata are also stored, the object and the service provider who is providing that object. The service providers of these two objects will be notified if it is a positive comment. However, if the comment is "It takes forever to show the directions" that would indicate the comment is negative and the implicit association found within the metadata indicates it is related the "show directions" component. In this case, only the service provider for the "show directions" is may be notified. In addition, depending on which UI component that is associated with the feedback, there may be a SLA for it, which may be displayed to the user prior to the user providing feedback on the object.

In exemplary embodiments, after the user's feedback has been received and the object that it relates to has been identified, the service provider who is responsible for the object will be notified of the feedback. In exemplary embodiments, this notification can be done via email or text message to service provider's administrator, or any dedicated communication path according to the administrator's preference. The service provider can elect to receive the information right away when a user provides the feedback or as a periodic report that aggregates the feedback from multiple users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational readable storage medium within the respective computing/processing device. steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for processing customer feedback on an application executing on a distributed computational system, wherein the distributed computational system includes a feedback processing system and a plurality of service providers, the method comprising:

executing the application on the distributed computational system, wherein the application when executed causes a user interface of the application to be displayed to a user, wherein the user interface includes a user interface object that is associated with at least a first component of the application and a second component of the application;

causing, by the feedback processing system of the distributed computational system, the user interface of the application to display an expected execution time for a functional component of the user interface object, wherein the first component of the application is provided by a first service provider of the plurality of service providers in the distributed computational system, wherein the second component of the application is provided by a second service provider of the plurality of service providers in the distributed computational system separate from the first service provider, wherein the functional component is at least one of the first or second components;

monitoring the execution of the application to detect when an execution time of the functional component exceeds the expected execution time;

subsequent to detecting that the expected execution time has been exceeded, causing a window to be displayed to the user via the user interface of the application, wherein the window is configured to accept unstructured text, wherein the window is created by a JavaScript element, wherein JavaScript element is configured to store in metadata the first and second components and a table of associated service providers, wherein the table of associated service providers maps the first service provider to the first component and maps the second service provider to the second component;

subsequent to causing the window to be displayed to the user, receiving, by the feedback processing system of the distributed computational system, via the window of the user interface of the application, feedback from the user regarding the user interface object of the application, wherein the feedback includes unstructured text that is provided by the user via the window;

executing, by the feedback processing system, a sentiment analysis process on the unstructured text of the feedback to detect whether the feedback regarding the user interface object of the application is positive or negative;

upon detecting via the sentiment analysis process that the feedback regarding the user interface object of the application is positive, forwarding, by the feedback processing system, the positive feedback to both the first service provider and the second service provider;

upon detecting via the sentiment analysis process that the feedback regarding the user interface object of the application is negative, identifying, by the feedback processing system, whether the negative feedback corresponds to the first component or the second component of the user interface object of the application based on a detected. association found within the associated service providers table;

upon identifying, based on the detected association found within the associated service provider table, that the negative feedback corresponds to the first component of the user interface object of the application, forwarding, by the feedback processing system, the negative feedback to the first service provider associated with the first component; and upon identifying, based on the detected association found within the associated service providers table, that the negative feedback corresponds to the second component of the user interface object of the application, forwarding, by the feedback processing system, the negative feedback to the second service provider associated with the second component.

2. The computer-implemented method of claim 1, wherein the user interface object further includes at least one non-functional component, wherein the non-functional components are non-interactive components of the application that the user does not directly interact with but which are utilized by the application to perform one or more application functions.

3. The computer-implemented method of claim 1, wherein the receiving of the feedback from the user of the application comprises receiving from the user interface of the application feedback via at least typed text.

4. The computer-implemented method of claim 1, wherein the feedback includes user responses to a plurality of questions regarding the application.

5. The computer-implemented method of claim 4, wherein the associated service provider table is mapped based on the user responses to the plurality of questions regarding the application.

6. The computer-implemented method of claim 1, wherein the user interface object is a find a store object that includes two functional components, wherein the first component of the user interface object is a locate a store function of the find a store object, and wherein the second component of the second-user interface is a show directions function of the find a store object, wherein the locate a store function is provided by the first service provider.

7. A computer program product for analysis of customer feedback on an application executing on a distributed computational system, wherein the distributed computational system includes a feedback processing system and a plurality of service providers, the computer program product comprising:
   a non-transitory storage medium readable by a processing circuit and storing instructions for execution by the processing circuit for performing a method comprising:
      executing the application on the distributed computational system, wherein the application when executed causes a user interface of the application to be displayed to a user, wherein the user interface includes a user interface object that is associated with at least a first component of the application and a second component of the application;
      causing, by the feedback processing system of the distributed computational system, the user interface of the application to display an expected execution time for a functional component of the user interface object, wherein the first component of the application is provided by a first service provider of the plurality of service providers in the distributed computational system, wherein the second component of the application is provided by a second service provider of the plurality of service providers in the distributed computational system separate from the first service provider, wherein the functional component is at least one of the first or second components;
      monitoring the execution of the application to detect when an execution time of the functional component exceeds the expected execution time;
      subsequent to detecting that the expected execution time has been exceeded, causing a window to be displayed to the user via the user interface of the application, wherein the window is configured to accept unstructured text, wherein the window is created by a JavaScript element, wherein JavaScript element is configured to store in metadata the first and second components and a table of associated service providers, wherein the table of associated service providers maps the first service provider to the first component and maps the second service provider to the second component;
      subsequent to causing the window to be displayed to the user receiving, via the window of the user interface of the application, feedback from the user regarding the user interface object of the application, wherein the feedback includes unstructured text that is provided by the user via the window;
      executing, by the feedback processing system, a sentiment analysis process on the unstructured text of the feedback to detect whether the feedback regarding the user interface object of the application is positive or negative;
      upon detecting via the sentiment analysis process that the feedback regarding the user interface object of the application is positive, forwarding, by the feedback processing system, the positive feedback to both the first service provider and the second service provider;
      upon detecting via the sentiment analysis that the feedback regarding the user interface object of the application is negative, identifying whether the feedback corresponds to the first component or the second component of the user interface object based on a detected association found within the associated service providers table;
      upon identifying, based on the detected association found within the associated service providers table, that the negative feedback corresponds to the first component of the user interface object of the application, forwarding the feedback to the first service provider associated with the first component; and
      upon identifying, based on the detected association found within the associated service providers table, that the negative feedback corresponds to the second component of the user interface object of the plurality of user interface objects of the application, forwarding, by the feedback processing system, the negative feedback to the second service provider associated with the second component.

8. The computer program product of claim 7, wherein the user interface object further includes and at least one non-functional component; wherein the non-functional components are non-interactive components of the application that the user does not directly interact with but which are utilized by the application to perform one or more application functions.

9. The computer program product of claim 7, wherein receiving the feedback from the user of the application comprises receiving from the user interface of the application feedback via at least typed text.

10. The computer program product of claim 7, wherein the feedback includes user responses to a plurality of questions regarding the application.

11. The computer program product of claim 10, wherein the associated service providers table is mapped based on the user responses to the plurality of questions regarding the application.

12. The computer program product of claim 7, wherein the user interface object is a find a store object that includes two functional components, wherein the first component of the user interface object is a locate a store function of the find a store object, and wherein the second component of the user interface object is a show directions function of the find a store object, wherein the locate a store function is provided by the first service provider.

13. A processing system for analysis of customer feedback on an application executing on a distributed computational system, wherein the distributed computational system includes a plurality of service providers, the processing system comprising:
 a processor in communication with one or more types of memory, the processor configured to:
  execute the application on the distributed computational system, wherein the application when executed causes a user interface of the application to be displayed to a user, wherein the user interface includes a user interface object that is associated with at least a first component of the application and a second component of the application;
  cause the user interface of the application to display an expected execution time for a functional component of the user interface object, wherein the first component of the application is provided by a first service provider of the plurality of service providers in the distributed computational system, wherein the second component of the application is provided by a second service provider of the plurality of service providers in the distributed computational system separate from the first service provider, wherein the functional component is at least one of the first or second components;
  monitor the execution of the application to detect when an execution time of the functional component exceeds the expected execution time;
  subsequent to detecting that the expected execution time has been exceeded, cause a window to be displayed to the user via the user interface of the application, wherein the window is configured to accept unstructured text, wherein the window is created by a JavaScript element, wherein JavaScript element is configured to store in metadata the first and second components and at able of associated service provider, wherein the table of associated service providers maps the first service provider to the first component and maps the second service provider to the second component;
  subsequent to causing the window to be displayed to the user, receive, via the window of a user interface of the application, feedback from the user regarding the user interface object of the application, wherein the feedback includes unstructured text that is provided by the user via the window;
  execute a sentiment analysis process on the unstructured text of the feedback to detect whether the feedback regarding the user interface object of the application is positive or negative;
  upon detecting via the sentiment analysis process that the feedback regarding the user interface object of the application is positive, forward the positive feedback to both the first service provider and the second service provider;
  upon detecting via the sentiment analysis process that the feedback regarding the user interface object of the application is negative, identify whether the negative feedback corresponds to the first component or the second component of the user interface object of the application based on a detected association found within the associated service providers table;
  upon identifying, based on the detected association found within the associated service providers table, that the negative feedback corresponds to the first component of the user interface object of the application, forward the negative feedback to the first service provider associated with the first component; and
  upon identifying, based on the detected association found within the associated service providers table, that the negative feedback corresponds to the second component of the user interface object of the plurality of user interface objects of the application, forward the negative feedback to the second service provider associated with the second component;
  wherein the received feedback is received from the user interface of the application via at least typed text;
  wherein the feedback includes user responses to a plurality of questions regarding the application; and
  wherein identifying whether the negative feedback corresponds to the first component or the second component is based on the user responses to the plurality of questions regarding the application.

14. The processing system of claim 13, wherein the user interface object further includes at least one non-functional component, wherein the non-functional components are non-interactive components of the application that the user does not directly interact with but which are utilized by the application to perform one or more application functions.

15. The processing system of claim 13, wherein the functional component is at least one of a find a store location of the website, a hyperlink on the website or an ordering function of the website.

16. The processing system of claim 13, wherein the processor is further configured to:
 collect the metadata from the user interface and disseminate the metadata to the first service provider associated with the first component along with the user feedback.

17. The processing system of claim 13, wherein the metadata comprises at least one of geographic information, browser version or user time spent on a website.

18. The processing system of claim 13, wherein the user interface object is a find a store object that includes two functional components, wherein the component of the first-user interface is a locate a store function of the find a store object, and wherein the second component of the user interface object is a show directions function of the find a store object, wherein the locate a store function is provided by the first service provider.

* * * * *